United States Patent [19]
Roth et al.

[11] Patent Number: 5,212,678
[45] Date of Patent: May 18, 1993

[54] SYSTEM FOR RECORDING AND READING INFORMATION ON A RECORD CARRIER AT A CONSTANT SCANNING SPEED INDEPENDENT OF THE BIT RATE OF SUCH INFORMATION

[75] Inventors: Rudolf Roth; Johannes C. Van Offenbeek, both of Eindhoven, Netherlands

[73] Assignee: U.S. Philips Corporation, New York, N.Y.

[21] Appl. No.: 896,803

[22] Filed: Jun. 9, 1992

Related U.S. Application Data

[63] Continuation of Ser. No. 590,392, Sep. 28, 1990.

[30] Foreign Application Priority Data

Nov. 23, 1989 [NL] Netherlands ................ 8902895

[51] Int. Cl.$^5$ .................... G11B 5/09; G11B 7/00
[52] U.S. Cl. .................... 369/60; 369/D32; 369/043; 369/244.23
[58] Field of Search ............... 346/1.1; 360/72.1, 72.2, 360/51, 8, 9.1, 36.1, 36.2; 369/124, 120, 59, 48, 47, 44.32, 32, 60; 358/337, 339, 320

[56] References Cited

U.S. PATENT DOCUMENTS

| | | | |
|---|---|---|---|
| 4,067,044 | 1/1978 | Maeda et al. | 369/32 |
| 4,413,289 | 11/1983 | Weaver et al. | 360/51 |
| 4,536,864 | 8/1985 | Van Rosmalen | 369/44.32 |
| 4,924,447 | 5/1990 | Fuji et al. | 369/124 |

Primary Examiner—Aristotelis Psitos
Assistant Examiner—Paul W. Huber
Attorney, Agent, or Firm—Leroy Eason

[57] ABSTRACT

A recording and read system capable of for recording and reading information (Va) on/from a record carrier (1) with a higher speed than that with which it is received or supplied. In order to compensate for differences between the recording speed and the read speed and between the receiving speed and the supply speed the device includes an input buffer memory (6) and an output buffer memory (11). In order to minimize the required storage capacity of the buffer memories (6, 11), the device comprises a control unit (10) which is loaded with a control program which temporarily interrupts the recording and read process in such a way that the degree of filling of the capacity of the input buffer memory (6) and of the capacity of the output buffer memory (11) remains within specific limits.

20 Claims, 5 Drawing Sheets ns.
SYSTEM FOR RECORDING AND READING INFORMATION ON A RECORD CARRIER AT A CONSTANT SCANNING SPEED INDEPENDENT OF THE BIT RATE OF SUCH INFORMATION This is a continuation of application Ser. No. 07/590,392, filed Sep. 28, 1990.

BACKGROUND OF THE INVENTION

1. Field of the Invention

The present invention relates to an information recording and read system of the type having scanning means for scanning a track on a record carrier of an inscribable type for the purpose of recording and reading information thereon. The scanning speed during recording substantially corresponds to the scanning speed during reading. A recording device records the information in the track at the scanning location, and a read device reads the information which has been recorded in the track at the scanning location. The invention also relates to the recording device and the read device of such a system.

2. The Related Art

An optical recording and read system of the aforesaid kind is known from Applicant's European patent document EP-A 0,325,330, which corresponds to U.S. application Ser. No. 265,649 filed Nov. 1, 1988 now U.S. Pat. No. 4,999,825. Therein, for the purpose of recording and/or reading, the track of a disc-shaped optical record carrier is scanned by a radiation beam which is focused on the record carrier.

In order to enable the recording and read process to be optimized, various servo arrangements are needed for scanning control. For example, optical recording and read devices include inter alia a tracking control for keeping the radiation beam on the track, a focus control for keeping the radiation focused on the record carrier, and a speed control for controlling the scanning speed. The disturbances which affect the servo systems are mainly disturbances caused by imperfections of the record carrier, such as for example an eccentric position of the center of rotation, non-circularity of the tracks and non-flatness of the record carrier. The width of the frequency spectrum of these disturbances is a direct function of the scanning speed, so that optimum adaption of the servo system to such disturbances also depends strongly on the scanning speed.

This dependence constitutes a problem when a recording and read device processes a digital signal, for example a digitized audio or video signal, whose bit rate, for example as a result of another digitizing method or data compression, is lower than that for which the recording device was designed. Maintaining the scanning speed at the original value during recording then has the drawback that the information density on the record carrier, as represented by the required length per date bit, will be substantially reduced and so the available storage capacity of the record carrier is only partly utilized. Conversely, reducing the scanning speed has the drawback that the operation of the servo systems will no longer be optimal.

SUMMARY OF THE INVENTION

It is an object of the invention to provide a recording and read system of the foregoing type which is adapted to record digitized information having a bit rate lower than that for which the device has been designed originally, without any detrimental affect on the information density of the record carrier and the performance of the servo systems.

The recording and read system in accordance with the present invention includes a recording device having an input buffer memory for, prior to recording, temporarily storing information to be recorded, a recording control for interrupting the recording and jumping the scanning spot to a preceding portion of the track, and then resuming the recording process when the track portion where recording was interrupted is reached again, in such a way that the degree of filling of the input buffer memory remains between specific limits. The read device comprises an output buffer memory for temporary storage of the read-out information prior to outputting it, and a read control for interrupting storage of the read-out information and jumping the scanning spot to a preceding track portion. Storage of the read-out information is resumed when the track portion where storage was interrupted is reached again, in such a way that the degree of filling of the output buffer memory remains between specific limits. As a result of the above steps the scanning speed during recording and reading, using the same information density, is independent of the speed with which the information to be recorded is received or at which the read-out information is supplied, so that at a scanning speed for which the operation of the servo systems is optimum the device in accordance with the invention is, in principle, capable of recording and/or reading the information having a bit rate lower than the bit rate corresponding to the scanning speed.

It is to be noted that European patent document EP-A-0,196,590 describes a magento-optical recording and read system in which the recording speed is equal to twice the speed with which the information is received and in which the difference in recording speed and receiving speed is compensated for by using an input buffer memory. However, this document concerns a system in which each time before new information is recorded the recording speed is increased to provide time to perform an additional erase operation on the track portion in which such information is to be recorded. As a result of the increased recording speed a difference arises between the scanning speed during recording and during reading, which adversely affects the performance of the servo systems.

Moreover, U.S. Pat. No. 4,536,864 describes a read device for reading optical record carriers of the read only type, in which the reading speed of the record carrier is increased relative to the nominal reading speed, so that the speed of reading becomes higher than the speed at which the information is supplied. The difference between the reading speed and the information supply speed is compensated for by an output buffer memory. However, the increase in reading speed is only utilized to reduce the susceptibility to shocks of the servo systems.

An illustrative embodiment of applicant's system is characterized in that the recording device comprises a modulator for modulating, prior to recording, an information signal which is representative of the information to be recorded, and the read device comprises a demodulator for demodulating, after reading, the recorded modulated information signal. The recording device is adapted to store the unmodulated information signal in the input buffer memory, and/or the read device is adapted to store the information signal read, after it has been demodulated, in the output buffer memory.

This illustrative embodiment advantageously utilizes the fact that the number of bits in the unmodulated information signal is smaller than in the modulated information signal. Thus, for the storage of the unmodulated information signal a comparatively small storage capacity of the buffer memories is adequate. The last mentioned embodiment is particularly attractive for recording information in a track having a preformed track modulation representing the track address information. Since in this embodiment the difference in receiving time and recording time of the information is compensated for by the temporary storage of the still non-modulated information signal, it is possible during recording to add the address information derived from the track modulation directly to the information signal during modulation. This is in contradistinction to a storage method in which the modulated information signal is stored temporarily.

When the recording process has been interrupted and resumed the phase of the recorded signal directly before the position where recording has been interrupted may not be contiguous to the phase of the recorded signal immediately after this point. During reading, such a phase discontinuity (phase jump) of the recorded information may give rise to read error. When a digitized audio or video signal is recorded to which redundant parity information has been added for the purpose of error correction, such as for example in the case of an audio signal digitized in conformity with the CD standard, such read errors caused by phase discontinuities do not present a real problem because in general such read errors can be corrected readily on the basis of the redundant parity information added to the signal.

An attractive embodiment of the system, which enables phase discontinuities and hence any adverse effects thereof to be reduced considerably, is characterized in that the recording means are clocked, the device further comprising synchronization means for synchronizing a clock signal for the control of the recording process with a data clock signal derived from information read from a track portion which is scanned prior to resumption of the recording.

Another embodiment of the system is characterized in that the device comprises address-generating means for supplying addresses which are indicative of the instantaneous scanning location, the recording control means and/or read control means being adapted to interrupt the recording and/or read process at an instant which is shifted by a predetermined time relative to the recording and/or read process of a synchronization code included in the information. The recording and/or read control means in such embodiment comprises means for storing the address associated with the position of interruption of the recording or read process, and means for determining the position in the track where recording or reading should be resumed on the basis of the stored address and one of the synchronization codes included in the information which is read prior to resumption. If for determining the point of interruption and resumption in the track use is made of the available address information and synchronization codes, the points where the information read out is interrupted can be selected independently of the points where recording of this information has been interrupted. This has the advantage that during reading the points where reading begins can be selected independently of the points where the information has been interrupted during recording. This is in contradistinction to recording and read methods in which additional codes are added to the modulated information signal to indicate where recording and reading may be interrupted.

BRIEF DESCRIPTION OF THE DRAWINGS

Further embodiments and the advantages thereof will now be describe in detail with reference to FIGS. 1 to 7, in which.

DETAILED DESCRIPTION OF THE INVENTION

Figure 1:
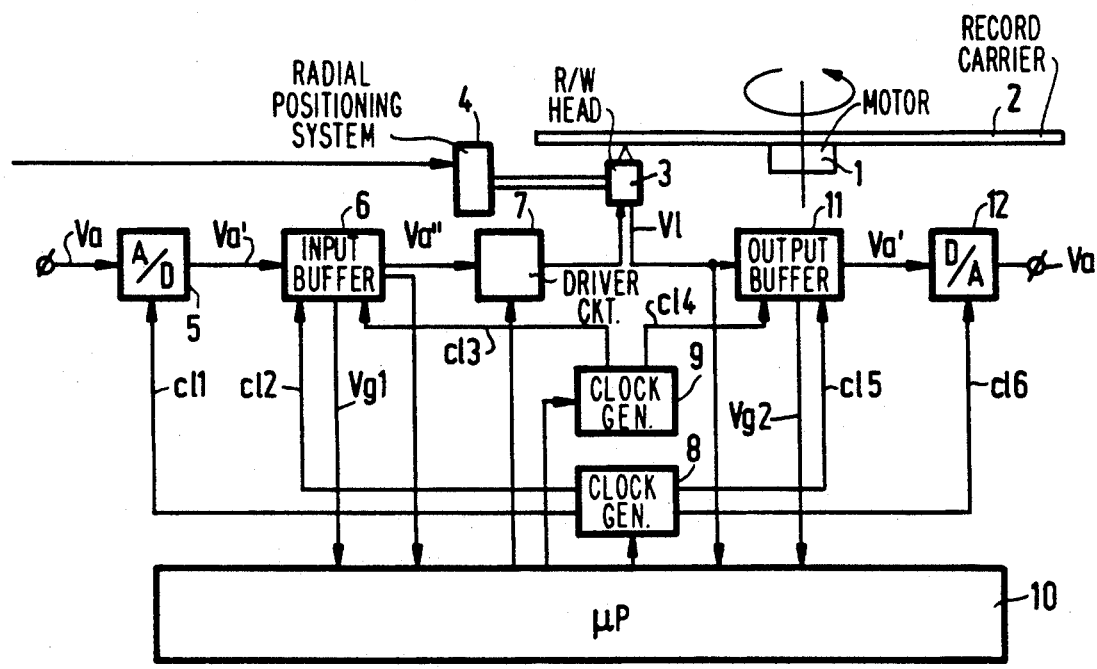
FIGS. 1 and 6 show embodiments of a recording and read system in accordance with the invention.

FIG. 1 depicts a first illustrative embodiment of a recording and read system in accordance with the invention. The device comprises a motor 1 for rotating a disc-shaped record carrier 2 of an inscribable type about its axis, for example the carrier may be an optical record carrier having a spiral track. A read/write head 3 is arranged opposite the rotating record carrier 2. The read/write head 3 may comprise, for example, a customary optical read and write head by which a track on the record carrier 2 is scanned with a radiation beam for the purpose of reading and recording information. The system comprises a tracking system (not shown) of a customary type, which insures that the center of scanning spot formed on the record carrier substantially coincides with the track center. The device further comprises a focus control (not shown) for keeping the scanning beam in focus on the record carrier, a scanning-speed control system (not shown) of a customary type for controlling the speed with which the record carrier 2 is moved past the read/write head 3. Under the control of a radial positioning system 4, the read/write head 3 can be moved in a radial direction relative to the record carrier 2.

The recording and read system further comprises circuitry for digitizing an analog signal Va, for example a clocked analog-to-digital converter 5. In addition to an analog/digital converter, the circuitry for digitizing the analog signal may also comprise a digital processing circuit for compressing the digital signal provided at the output of the analog-to-digital converter. Moreover, it is not necessary that the information to be recorded be presented in analog form. This information may also be presented in digital form and may be converted by a digital processing circuit, such as for example a standard digital audio interface circuit, prior to recording. When the analog-to-digital converter 5 is used the bit rate of the digitized signal Va' depends on the desired quality of the digitized signal, largely dictated by the number of bits per signal sample and the sampling rate. However, the use of data compression techniques may reduce the bit rate without a significant loss of quality. All this may result in the bit rate of the digitized signal being substantially lower than the bit rate of customary digitized signals such as a standard CD signal or a DAT signal. This means that the bit rate of the digitized signal to be recorded no longer corresponds to the bit rate of the signal for which the customary recording and read devices for digitized information have been designed. During recording this difference in bit rate can be compensated for by the use of an input buffer memory 6, for example of the First-In-First-Out (FIFO) type, which is arranged between the analog-to-digital converter 5 and a driver circuit 7 for the read/write head 3 and which is loaded at a rate corresponding to the bit rate of the digitized signal Va' on the output of the analog-to-digital converter 5, the information being read out of the memory to be applied to a data input of the driver circuit 7 at a rate corresponding to the scanning speed during recording.

For controlling the analog-to-digital conversion and the process of loading the input buffer memory 6, the device comprises a first clock signal generator 8 for supplying a clock signal cl1 to the analog-to-digital converter 5 and a clock signal cl2, which is related to clock signal cl1, to the input buffer memory 6. It is to be noted that the frequency of the clock signal cl1 dictates the bit rate of the digitized signal Va'.

A second clock signal generator 9 supplies a transfer clock signal cl3 to the input buffer memory 6 for fetching the information from the input buffer memory 6, the transfer clock signal cl3 having a frequency which is related to the scanning speed during recording. In order to minimize the storage capacity of the input buffer memory 6, the recording process can be controlled in such a way that when a specific upper limit of the degree of filling the input buffer memory 6 is exceeded an information output cycle is performed, in which the information stored in the input buffer memory 6 is fetched and is subsequently recorded. The cycle of fetching and recording the information is sustained until the degree of filling has come below a specific lower limit, after which the fetching and recording cycle is stopped until the degree of filling has again exceeded the upper limit. To realize such a control process, the system comprises recording control means, which comprise for example a programmable control unit in the form of a microcomputer 10 loaded with a suitable program. The microcomputer 10 is coupled to the radial positioning system 4, and by supplying a control signal thereto causes a jump of the scanning spot in the radial direction by a specific number of tracks. The microcomputer is further coupled to the clock signal generators 8 and 9 for activating and de-activating the generation of the clock signals supplied by the generators 8 and 9. The microcomputer 10 also supplies a control signal to the driver circuit 7. The driver circuit 7 is constructed in such a way that depending upon the received control signal the read/write head 3 is set to the read mode or to the write mode. In the read mode, the write/head 3 supplies a read signal V1 which is representative of the information recorded in the track portion being scanned by the read/write head 3 at the scanning location. In the write mode, the information received on the data input of the driver circuit 7 is recorded by the write/read head 3. For the purpose of controlling the recording process and the microcomputer 10, the input buffer memory 6 further supplies an indication signal Vg1 which is indicative of the degree of filling of the input buffer memory 6. Moreover, an output signal of the input buffer memory 6, which signal represents the information fetched from the input buffer memory, is applied to the microcomputer 10. Finally, the read/write head 3 is also coupled to the microcomputer 10 to supply the read signal V1 thereto.

Figure 3:
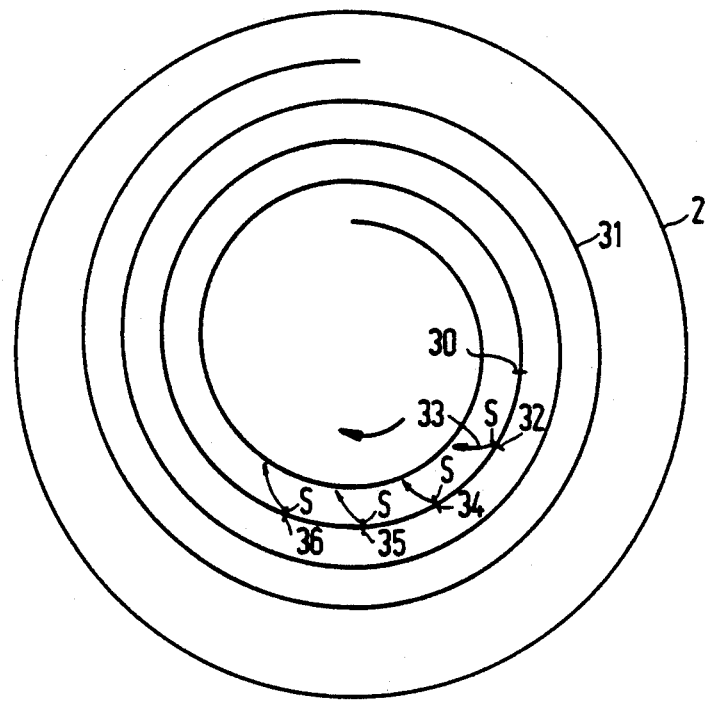
FIG. 3 is a plan view of a record carrier to illustrate the invention.

The method of controlling the recording process will now be explained with reference to FIG. 2, which is a flow chart of a suitable recording control program, and FIG. 3, which is a plan view of said information carrier 2 and the spiral track 31 thereon.

Figure 2:
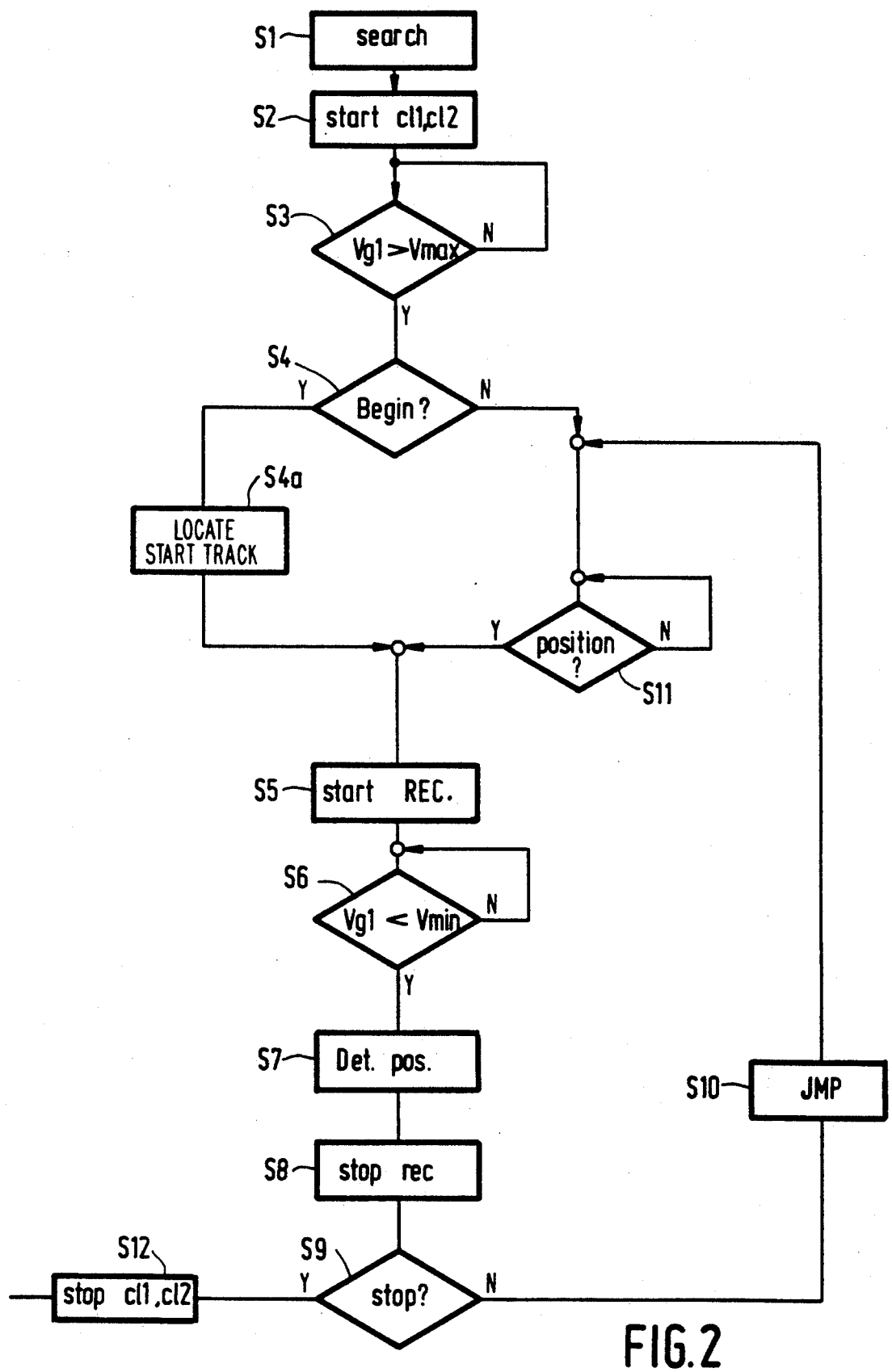
FIGS. 2 and 4 are flow charts of control programs carried out by control units in recording and read systems in accordance with the invention.

The program, whose flow chart is shown in FIG. 2, comprises a step S1 which is performed when analog information to be recorded is applied to the analog-to-digital converter 5. During step S1 the read/write head 3 is moved in a customary manner to a desired radial position where the recording should start under control of the microcomputer 10. Subsequently, in step S2, the analog-to-digital converter 5 is activated by activating the generation of the clock signal cl1. It is to be noted that it is not necessary to delay analog-to-digital conversion until the read/write head 3 has reached the desired position. It may also be effected prior to the search for the desired position. The digitized information on the output of A/D converter 5 is loaded into the input buffer memory 6 in synchronism with the load clock signal cl2. After the step S2, in step S3 it is ascertained on the basis of the indication signal Vg1 whether the degree of filling of the input buffer memory 6 has exceeded a specific value Vmax. Once the degree of filling has exceeded this value, it is checked in the step S4 whether the information stored in the input buffer memory 6 constitutes the first packet of information to be recorded. If this is the case, the track where recording can be started is located during the step S4a in a manner as described, for example, in European Patent Document EP-A-0,325,329 which corresponds to U.S. application Ser. No. 286,574 filed Dec. 16, 1988. Subsequently, recording is started in step S5. During step S5 the generation of the transfer clock signal cl3 is activated, so that the information stored in the input buffer memory 6 is applied to the control circuit 7 in synchronism with the transfer clock signal cl3. Moreover, during the step S5 the read/write head 3 is set to the write mode, causing the information applied to the driver circuit to be recorded. By way of illustration the point where recording in the spiral track 31 begins is indicated by the reference numeral 30 in FIG. 3.

The speed with which the information is fetched from the input buffer store 6 is higher than the speed with which the input buffer memory 6 is loaded, so that the degree of filling of the input buffer memory 6 will decrease as recording proceeds. In the step S6 it is ascertained whether the degree of filling of the input buffer memory has decreased below a specific limit Vmin. If this is the case, the position in the track where recording is to be interrupted is determined during step S7. Moreover, the information specifying this position is stored for example, in the memory of the microcomputer 10. If the recorded information includes address information, the location where the recording is to be interrupted can be defined roughly by an address included in the information. The exact position of the interruption can be represented by a synchronization code which is recorded at a predetermined position relative to the position of interruption. This synchronization code may comprise a code which can be distinguished from the information and which for this purpose has been added to the information to be recorded. If the information to be recorded already includes synchronization codes, such as for example the EFM synchronization signals or the sub-code synchronization signals in a standard CD signal, these are preferably used for indicating the exact position of the interruption of the recording. This can be achieved, for example, by interrupting the recording at a fixed instant after the next synchronization code appearing after the degree of filling has dropped below the limit value Vmin. The actual interruption of the recording is realized in the step S8. In this step, at the instant at which the position is reached where the recording is to be interrupted, the read/write head 3 is set to the read mode dn at the same time the transfer of the information from the input memory store 6 is discontinued by de-activating the generation of the transfer clock signal c13. In FIG. 3 the point where the recording is interrupted in the track 31 bears the reference numeral 32. After the step S8 it is ascertained during the step S9 whether all the information packets have already been recorded. If this is not the case the step S10 is carried out, in which the read/write head is made to jump over one or more tracks to a turn of the spiral track which precedes the track portion in which a recording has been interrupted. In FIG. 3 this jump is indicated by an arrow 33. As a result of the radial jump a track portion is scanned which is situated before the point 32 where the recording has been interrupted. During the step S11 it is tested by means of the read signal V1 whether the point 32 is reached again. This is possible, for example, by comparing the address information obtained during reading with the stored address, which roughly indicates the position where the recording has been interrupted. Subsequently, the exact position of the interruption can be determined by detecting the next synchronization code which appears in the read signal V1 after coincidence between the addresses has been detected. Upon detection of the exact position of the interruption, recording is resumed by performing the step S5. It is to be noted that instead of the method described hereinbefore the instant of resuming can also be determined depending upon the degree of filling. For example, it is possible to postpone the resumption of the recording process until the degree of filling of the input buffer memory has exceeded a specific maximum value and, subsequently, to locate the point where the recording has been interrupted. During recording of the entire signal to be recorded the recording is each time interrupted temporarily at the positions indicated by the reference numerals 33, . . . , 36 in the track 31. This process of interrupting and resuming the recording proceeds until in the step S9 the last packet of the information to be recorded is detected and the step S12 is performed. During the step S12 digitization of the information applied to the analog-to-digital converter 15 and loading of the digitized information into the input buffer memory 6 is stopped by deactivation of the transfer clock signal C12 and the clock signal C11. It is to be noted that in general the input buffer memory will then not yet be completely empty. This is not a problem when audio signals are to be recorded, because it concerns only very brief signal portions. However, if the entire audio signal is to be recorded, the buffer memory can be replenished with a signal representing silence and the position where the recording is terminated can be selected in such a way that the instant of stopping appears while the signal representing this silent passage is recorded.

The recorded information can be read by scanning the track in which the information has been recorded with the read/write head 3, which should be set the read mode for this purpose. The read/write head 3 then supplies the read signal V1 which can be loaded into an output buffer memory 11 in synchronism with a load clock signal c14 generated by the clock signal generator 9. The information loaded into the output buffer store 11 can be extracted in synchronism with a transfer clock signal c15 generated by the clock signal generator 8. The extracted information is applied to a digital-to-analog converter 12, which is controlled by a clock signal c16, which is also generated by the clock signal generator 8. The recorded information is available in analog form on the output of the digital-to-analog converter 12. The speed with which the track on the record carrier is scanned during reading of the recorded information is selected to be equal to the scanning speed during recording, so that the tracking control system can be optimized both for recording and for reading. The frequency of the transfer clock signal c14 is selected in such a way that the speed with which the output buffer memory 11 is loaded corresponds to the scanning speed during information reading. The frequencies of the clock signal c15 and c16 are selected in such a way that the speed with which the analog information appears on the output of the digital-to-analog converter 12 corresponds to the speed with which this information was received by the analog-to-digital converter 5, so that upon reading a faithful reproduction of the recorded information is achieved. The information is read under control of the microcomputer 10, which is loaded with a program suitable for this purpose.

Figure 4:
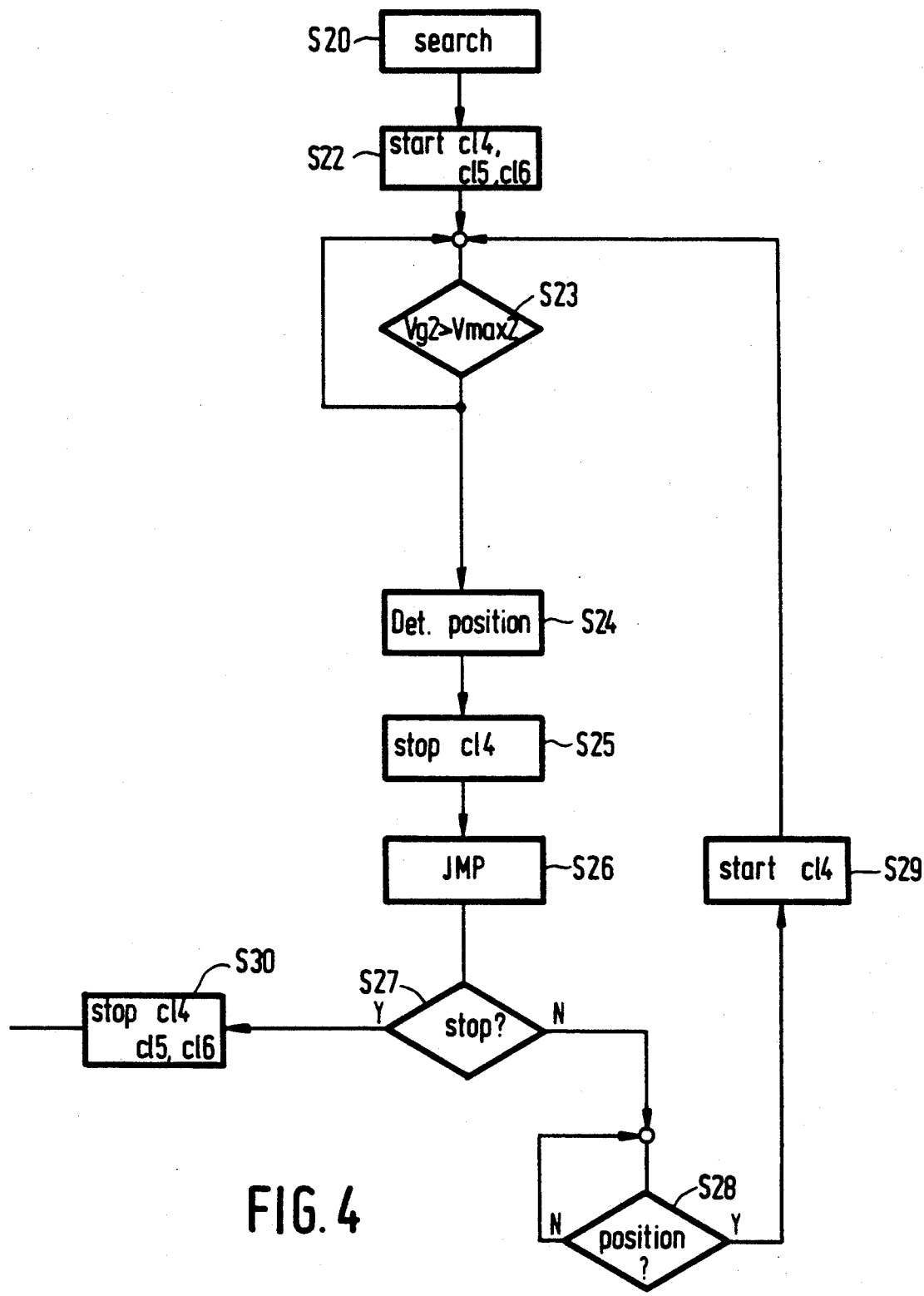

FIG. 4 is a flow chart of a suitable read-out control program. This program includes a step S20 in which under control of the microcomputer 10 the read/write head 3 is positioned opposite the track portion in which the information to be read has been recorded. Subsequently, in the step S22 reading is started by activating the generation of the clock signals c14, c15 and c16. As a result of the activation of the clock signal generation the information read is loaded into the output buffer memory 11 with a speed corresponding to the read speed. The stored information is fetched from the output buffer memory 11 with a speed lower than the loading speed and is subsequently converted into analog form by the digital-to-analog converter 12. As a result of the difference between the fetching speed and the loading speed the degree of filling of the output buffer memory will increase. In the step S23 the degree of filling, which is indicated by an indication signal Vg2 generated by the output buffer memory 11, is compared with a maximum value Vmax1. When the degree of filling exceeds the maximum value the step S24 is carried out, in which the position is determined where loading into buffer memory 11 of the information being read is to be interrupted. The can be determined in a manner similar to the manner in which the interruption is determined during recording, on the basis of address information which indicates the scanning position and of the synchronization codes included in the recorded information. When this position is reached information reading and loading of such information into the output buffer memory 11 is discontinued in the step S25 by de-activating the generation of the clock signals c15 and c16. Subsequently, in the step S26 the scanning spot is made to perform a radial jump to a turn of the spiral track which precedes the point where reading was interrupted.

Subsequently, in the step S27 it is checked whether all the packets of the desired information have been read completely. If this is not the case, it is ascertained during step S28 on the basis of, for example, the address information and the synchronization codes in the signals being read, whether the point where reading was interrupted is reached again. As soon as this point is reached, loading of the output buffer memory 11 is resumed by activation of the clock signal c14 in the step S29. After the step S29 the step S23 is repeated and loading of the information being read is interrupted again when the degree of filling of the output buffer memory 11 again exceeds the value Vmax2.

This process of each time temporarily interrupting the storage of the information being read proceeds until during the step S27 it is ascertained that all the desired information has been read, after which the step S30 is performed, in which the extraction of information from the output buffer memory is discontinued by de-activating the generation of the clock signals c15 and c16 as soon as the output buffer is empty.

In the recording and read system described hereinbefore it is achieved that the scanning speed during recording and reading is independent of the speed with which the information is received or is to be supplied by the use of the buffer memories 6 and 11 and by controlling the recording and the reading process. By simply adding buffer memories and a simple-to-realize adaptation of the control program this enables an existing design of a recording and read device to be converted into a recording and read device by means of which digitized information can be recorded whose bit rate is lower than the bit rate of the digitized information for which the device has been designed originally.

When digital information is recorded it is often subjected to an additional modulation process prior to recording, in order to render the information to be recorded better suitable for recording. In general this means that the bit rate of the information after encoding will be higher than prior to modulation. The storage of the non-modulated signal in the buffer memories is to be preferred over storage of the modulated signal therein because in the first case buffer memories having a smaller storage capacity can be used.

Figure 5A:
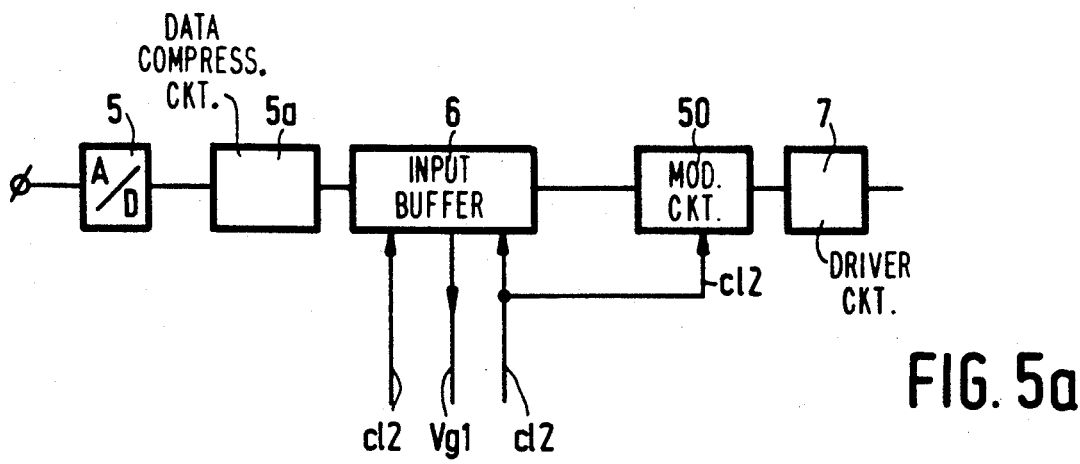
FIGS. 5a and 5b show modification to the system shown in FIG. 2.
Figure 5B:
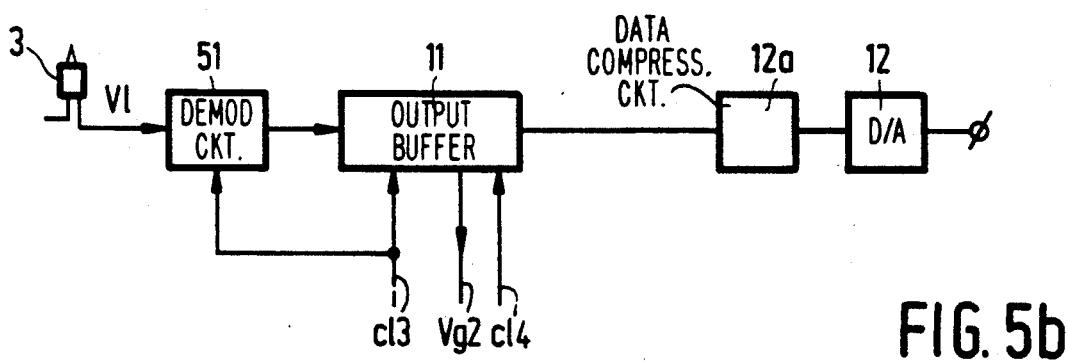

By way of illustration FIG. 5a and FIG. 5b show the preferred arrangements of the input and output buffer memories 6 and 11 in the case that the digitized information to be recorded is subjected to an additional modulation process. These Figures only show that part of the system of FIG. 1 which has been modified. In FIG. 5a these modifications pertain to inclusion of a modulation circuit 50 for modulating the information fetched from the input buffer memory. The modulation circuit 50 should be de-activated or activated at the same instant at which loading of the output buffer memory 11 is interrupted and resumed respectively. This can be realized simply, for example, by the use of a modulator which is clocked in synchronism with the load clock signal c13. Further, as another alternative, FIG. 5a includes a digital data compression circuit 5a arranged between the analog-to-digital converter 5 and the input buffer memory.

The modification shown in FIG. 5b pertain to a demodulation circuit 51 for demodulating of the information read before this information is applied to the output buffer memory 11. The demodulation circuit 51 should be rendered inoperative and operative at the same time that loading of the output buffer memory 11 is interrupted and resumed respectively. This can be realized simply, for example, by the use of a demodulator which is clocked in synchronism with the load clock signal c13. FIG. 5b, as another alternative, includes a digital data decompression circuit 12a arranged between the output buffer memory 11 and the digital-to-analog converter 12.

Figure 6:
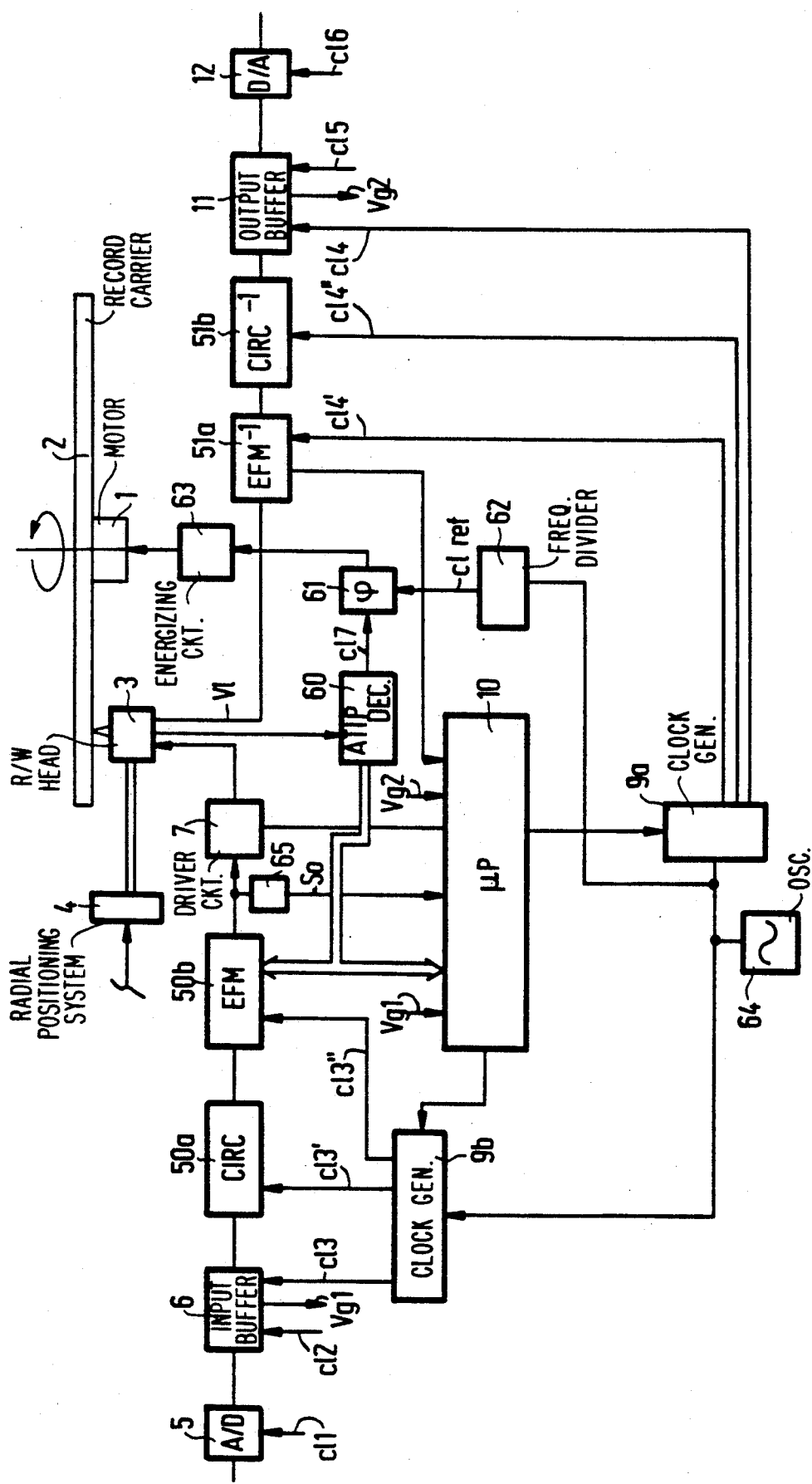

FIG. 6 shows another embodiment of a recording and read system in accordance with the invention for recording information modulated in conformity with a CD standard. The system shown is constructed to record information applied at a different rate than that prescribed by the CD standard. Elements in FIG. 6 which correspond to elements in the embodiments described above bear the same reference numerals.

The system shown is adapted to record EFM modulated information at a scanning speed situated within the limits of 1.2 m/s to 1.4 m/s prescribed by the CD standard on an optical record carrier having a servo track which exhibits a preformed track modulation representing track addresses. Such a record carrier is known inter alia from European patent document EP-A 0,325,330.

For the purpose of detecting the address information represented by the track modulation the device comprises an ATIP decoder 60, which derives from the detection signal supplied by the optical read/write head 3 an address code of the same format as the address code included in a standard CD signal. Moreover, the ATIP decoder derives a clock signal c17 of a frequency which is indicative of the scanning speed. Such an ATIP decoder 60 is described comprehensively in the above mentioned EP-A 0,325,330. By means of a phase detector 61 the phase of the clock signal c17 is compared with the phase of a reference clock signal clref, whose frequency is indicative of the desired scanning speed. By means of the frequency divider 62 the reference clock signal clref is derived from a central oscillator 64. An output signal of the phase detector 61, which signal is indicative of the phase difference between the clock signals c17 and clref, is applied to an energizing circuit 63 for the motor 1. The energizing circuit 63 is of a customary type which depending upon the detected phase difference controls the motor 1 in such a way that the phase difference remains substantially zero.

The modulator employed in the system shown in FIG. 6 comprises a customary CIRC encoder 50a and an EFM modulator 50b for converting digital information into EFM modulated information in accordance with a CD standard. The CIRC encoder 50a, the EFM modulator 50b and the input buffer memory 6 are controlled by a clock generator 9b which derives the required clock signals c13, c13', c13" by frequency division from the output signal of the central oscillator 64. The clock signal generator 9b is of a controllable type which can be enabled and disable by means of a control signal supplied by the microcomputer 10 to deactivate and activate the generation of the clock signals. The EFM modulator 50b is also coupled to the ATIP decoder 60 for receiving address codes which are added to the modulated EFM modulated signal by the EFM modulator 50b, the additional address codes being inserted in the subcode channel of the EFM modulated information in a customary manner.

The demodulator used in the device shown in FIG. 6 comprises a customary CIRC decoder 51a and EFM demodulator 51b. The CIRC decoder 51a, the EFM demodulator 51b and the output buffer memory 11 are controlled by clock signals c14', c14" and c14, which are derived by frequency division from the output signal of the central oscillator 64 by a clock signal generator 9a. The clock signal generator 9a is of a controllable type, which can be disabled and enabled by means of a control signal supplied by the microcomputer 10 to de-activate or activate the generation of the clock signals.

The recording and read process control in FIG. 6 is similar to that in the device shown in FIG. 1, except that the track positions where recording and/or loading of the output buffer memory 11 is/are interrupted and resumed is determined suitably on the basis of the subcode synchronization codes present in the EFM signal and the address information supplied by the ATIP decoder 60. In that case the EFM signal need not be adapted and the positions where the recording is interrupted can be selected independently of the positions where the process of loading the output buffer memory is interrupted. For the purpose of detecting the subcode synchronization code the device comprises a subcode synchronization detector 65 for detecting the presence of subcode synchronization codes in the output signal of the EFM modulator 50b. The output of the subcode synchronization code detector 65 supplied a detection signal for the microcomputer 10 in response to every detection of a subcode synchronization code. For the detection of the presence of subcode synchronization codes in the read signal the subcode synchronization detector normally present in the EFM demodulator 51a may be used.

Arranging the input buffer memory 6 before the EFM modulator 50b in the embodiment shown in FIG. 6 has an additional advantage. This is that as a result of this arrangement of the input buffer memory 6 the address codes supplied by the ATIP decoder 60 can be applied directly to the EFM modulator. This is in contrast to an embodiment in which the input buffer memory 6 is arranged after the EFM modulator 50b.

With respect to the position of the buffer memories it is to be noted that, in principle, the memories usually available in the CIRC encoder 50a and CIRC decoder 51b may be used, provided that their storage capacities are adequate. Alternatively, the buffer memories may be arranged between the CIRC encoder 50a and the EFM modulator 50b and between the EFM demodulator 51a and the CIRC decoder 51b. An essential feature is that the input buffer memory 6 is arranged in the data path before the modulator 50b and that the output buffer memory 11 is arranged in the data path after the demodulator 51a.

Figure 7:
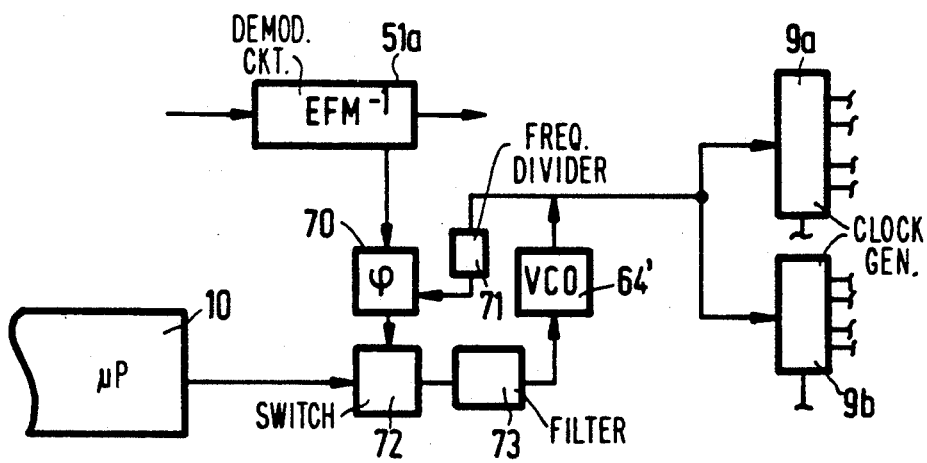
FIG. 7 shows a modification to the system illustrated in FIG. 6.

As a result of the temporary interruption and resumption of the recording process it may happen that the phase of the recorded signal exhibits a phase discontinuity at the location where the recording has been interrupted temporarily. During reading such a phase discontinuity may give rise to read errors. When information is recorded to which redundancy has been added for the purpose of error correction, such as for example in a standard CD signal, such read errors can generally be corrected without any problem. However, by comparatively simple means the magnitude of the phase discontinuity can be reduced by synchronizing the clock signal, which is applied for the purpose of controlling the extraction of information from the buffer memory 6, with a data clock signal derived from the read signal obtained by scanning the track portion situated before the position where recording is to be resumed. This may be realized, for example, by adapting the system shown in FIG. 6 in a manner as shown in FIG. 7. The adaptation involves the use of a voltage controlled oscillator as the central oscillator 64. (The voltage controlled oscillator bears the reference numeral 64' in FIG. 7). The voltage controlled oscillator 64' is included in a phase locked loop circuit. The phase locked loop comprises a phase detector for comparing the phase of a data clock signal derived from the read signal vl by means of the EFM demodulator 51 a, with the phase of a signal derived from the periodic output signal of the voltage controlled oscillator 64 by means of frequency divider 71. An output signal of the phase detector 70 which is indicative of the phase difference between the signals thus compared is fed back to a control input of the voltage controlled oscillator 64' via an electronic switch 72, which is controlled by microcomputer 10, and a loop filter 73 to adjust the frequency of the output signal of the oscillator 64'. By means of the electronic switch 72 the phase locked loop is opened or closed depending on the control signal supplied by the microcomputer 10. The synchronization of the output signal of the voltage controlled oscillator 64, and hence the synchronization of the clock signals c13, c13' and c13" for controlling the recording process, with the data clock signal is achieved by opening the phase locked loop during the recording process and closing it briefly before recording is resumed under control of the microcomputer 10.

The invention has been illustrated hereinbefore for a recording and read system for rotating disc-shaped record carriers. However, it is to be noted that the use of the invention is not limited to recording and read systems for rotating disc-shaped record carriers. In principle, the invention may be employed in any recording and read system in which a scanning means can be moved to a previous portion of the track. Moreover, the use of the invention is not limited to optical recording and read systems but the invention may also be employed in magnetic recording and read systems.

Moreover, it is to be noted that the decision criteria on the basis of which the recording and/or read process is interrupted and resumed are not limited to the decision criteria described hereinbefore. For example, it is possible to interrupt the recording and/or read process always after reading or recording information from/in an integral number of turns of the spiral track. Moreover, it is also possible, for example, not to resume recording and/or reading until a minimum time interval has elapsed. It is always essential that the storage capacity is selected to be adequate to compensate for the resulting fluctuations in the amount of information stored.

Finally, it is to be noted that the invention is not limited to systems in which the recording device and the read device form an integrated unit. The invention may also be embodied in systems comprising a separate recording device and a separate read device.

What is claimed is:

1. A system for receiving a digital signal at an input thereof and recording it on a track of a record carrier, and subsequently reading the recorded digital signal from said track and deriving therefrom an output digital signal which is supplied at an output of the system; the system comprising scanning means for producing a scanning spot which scans said track, write means adapted to use the scanning spot to record the input digital signal on the track, read means adapted to use the scanning spot to read from the track the digital signal which has been recorded thereon, programmable write control means for controlling actuation of said write means, and programmable read control means for controlling actuation of said read means; said system being characterized in that it further comprises:

an input buffer memory coupled between the input of said system and said write means for temporarily storing successive blocks of the data in the received digital signal, the stored data blocks being subsequently read-out to said write means for recording on said track;

said write control means being programmed to (i) periodically interrupt read-out from the input buffer and concurrently cause the scanning means to skip the scanning spot back to a previous track location and continue scanning from such previous location, and (ii) resume read-out from the input buffer when the scanning spot again reaches the track location at which scanning was previously interrupted; the periodic interruptions of read-out from the input buffer being such that the degree of filling of the input buffer is maintained within predetermined limits;

an output buffer memory coupled between said read means and the output of said system for temporarily storing the successive data blocks read from said track by said read means, the stored data blocks being subsequently read-out from the output buffer to form said output digital signal;

said read control means being programmed to (i) periodically interrupt read-in to the output buffer and concurrently cause the scanning means to skip the scanning spot back to a previous track location and continue scanning from such previous location, and (ii) resume read-in to the output buffer when the scanning spot again reaches the track location at which scanning was previously interrupted; the periodic interruptions of read-in to the output buffer being such that the degree of filling of the output buffer is maintained within predetermined limits;

whereby the received digital signal is recorded on said track and the recorded digital signal is read from said track at a predetermined constant scanning speed which is independent on the data rates of the received digital signal and the output digital signal.

2. An information recording and read system as claimed in claim 1, further comprising a modulator for modulating the received digital signal before it is recorded on said track, and a demodulator for demodulating the recorded modulated digital signal after it is read from said track.

3. An information recording and read system as claimed in claim 2, wherein said modulator is connected between said input buffer and said write means so that a block of the data in the received digital signal is stored in the input buffer prior to modulation thereof.

4. An information recording and read system as claimed in claim 2, wherein said demodulator is connected between said read means and said output buffer so that a block of the data in the recorded modulated signal is demodulated prior to storage thereof in the output buffer.

5. An information recording and read system as claimed in claim 2, wherein the track includes track address information, said modulator comprises means for adding address information to the received digital signal, and said write control means comprises means for deriving the track address information from a track being scanned and supplying such track address information to said modulator.

6. An information recording and read system as claimed in claim 3, wherein the track includes track address information, said modulator comprises means for adding address information to the received digital signal, and said write control means comprises means for deriving the track address information from a track being scanned and supplying such track address information to said modulator.

7. An information recording and read system as claimed in claim 4, wherein the track includes track address information, said modulator comprises means for adding address information to the received digital signal, and said write control means comprises means for deriving the track address information from a track being scanned and supplying such track address information to said modulator.

8. An information recording and read system as claimed in claim 1, wherein the write means are clocked by a write clock signal and the write control means further comprises means for synchronizing the write clock signal with a data clock signal derived from a data block which is read from the portion of the track which is scanned after the scanning spot is skipped back to a previous track location during recording and before it again reaches the track location at which it had been skipped.

9. An information recording and read system as claimed in claim 1, further comprising address generating means for supplying addresses indicative of the instantaneous track scanning locations, the write control means being adapted to interrupt the recording of information on the track at an instant which is shifted by a predetermined time interval relative to a synchronization code included in a block of data to be recorded; the write control means including means for storing the track address at which recording was interrupted and means for determining the track position at which recording is to be resumed on the basis of the stored track address and the synchronization code included in the data block to be recorded following said interruption.

10. An information recording and read system as claimed in claim 1, further comprising address-generating means for supplying addresses indicative of the instantaneous track scanning locations, the read control means being adapted to interrupt reading of the track at an instant which is shifted by a predetermined time interval relative to a synchronization code included in a block of recorded data to be read; the read control means including means for storing the track address at which reading of the track was interrupted and means for determining the track position at which reading is to be resumed on the basis of the stored track address and the synchronization code included in the recorded data block to be read following said interruption.

11. An information recording and read system as claimed in claim 1, wherein the scanning speed during recording and reading is between 1.2 and 1.4 meters per second.

12. Apparatus for recording a digital signal on a track of a record carrier said apparatus comprising:

scanning means for producing a radiation beam which forms a scanning spot which scans said track;

write means for controlling the intensity of said beam so as to cause the scanning spot to form recording marks on said track;

a buffer memory for receiving and temporarily storing successive data blocks of the digital signal, the stored data blocks being subsequently read-out from said buffer memory to said write means so as to cause it to form recording marks on said track; and programmable control means for periodically interrupting recording by said write means by (i) interrupting read-out from the buffer memory and concurrently causing the scanning means to return the scanning spot to a previous track location and resume scanning along said track from such previous location, and (ii) resuming read-out from the buffer memory when the scanning spot again reaches the track location at which scanning had previously been interrupted; the periodic interruptions of recording being such that the number of data blocks stored in said buffer memory is maintained within predetermined limits;

whereby successive data blocks of the digital signal are recorded on said track at a predetermined substantially constant scanning speed which is independent of the data rate of such signal.

13. Recording apparatus as claimed in claim 12, further comprising means for modulating the digital signal prior to recording thereof on said track.

14. Recording apparatus as claimed in claim 13 wherein said modulating means is connected between said buffer memory and said write means, so that data blocks of the digital signal are stored in the buffer memory prior to modulation thereof.

15. Recording apparatus as claimed in claim 14 wherein the track includes track address information, said modulating means comprises means for adding address information to data blocks of the digital signal, and said control means comprises means for deriving track address information from a track being scanned and supplying such track address information to said modulating means to be added thereby to the relevant data blocks.

16. Recording apparatus as claimed in claim 12 wherein said write means is clocked by a write clock signal, and said control means comprises means for synchronizing the write clock signal with a data clock signal derived from a recorded data block in a portion of the track which is again scanned after the scanning spot has been returned to a previous track location during a recording interruption and before recording is again resumed.

17. Recording apparatus as claimed in claim 12, further comprising address-generating means for supplying addresses indicative of the instantaneous track scanning locations, said control means being adapted to interrupt recording by said write means at an instant which is shifted by a predetermined time interval relative to a synchronization code included in a data block which is to be recorded; said control means including means for storing the track address at which recording was interrupted and means for determining the track position at which recording is to be resumed on the basis of the stored track address and the synchronization code in the data block which is to be recorded following said interruption.

18. Recording apparatus as claimed in claim 12, wherein the scanning speed during recording is between 1.2 and 1.4 meters per second.

19. An information recording and read system as claimed in claim 1 in combination with A/D conversion means coupled to the input of said system for deriving the digital signal which is to be recorded by conversion from a received analog information signal, and D/A conversion means coupled to the output of said system for converting the output digital signal to a corresponding analog output signal; said A/D conversion means comprising a data compression circuit for providing data compression of the digital signal to be recorded; and said D/A conversion means comprising a data decompression circuit for providing data decompression of the output digital signal prior to conversion thereof into said analog output signal.

20. Recording apparatus as claimed in claim 12, further comprising: an analog-to-digital converter for receiving an input analog information signal and converting it to digital form; and a data compression circuit for providing data compression of the digital signal produced by said analog-to-digital converter; the compressed digital signal produced by the data compression circuit being the digital signal which is supplied to said buffer memory.

* * * * *

UNITED STATES PATENT AND TRADEMARK OFFICE
CERTIFICATE OF CORRECTION

PATENT NO. : 5,212,678

DATED : May 18, 1993

INVENTOR(S) : Rudolf Roth and Johannes C. Van Offenbeek

It is certified that error appears in the above-indentified patent and that said Letters Patent is hereby corrected as shown below:

On the title page, Item [57]: Abstract;

line 1, delete "for";

line 3, change "(1)" to --(2)--;

line 8, change "In order to" to --To--.

Signed and Sealed this

Twenty-ninth Day of March, 1994

Attest:

BRUCE LEHMAN

Attesting Officer     Commissioner of Patents and Trademarks